United States Patent
Nolan et al.

(10) Patent No.: US 9,502,726 B2
(45) Date of Patent: Nov. 22, 2016

(54) CATHODE HUMIDIFICATION UNIT ADAPTING DEGRADATION FACTOR

(71) Applicant: GM Global Technology Operations LLC, Detroit, MI (US)

(72) Inventors: John P. Nolan, Rochester, NY (US); Daniel T. Folmsbee, Victor, NY (US); Derek R. Lebzelter, Conneaut, OH (US); Yan Zhang, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 468 days.

(21) Appl. No.: 13/939,578

(22) Filed: Jul. 11, 2013

(65) Prior Publication Data

US 2014/0272630 A1    Sep. 18, 2014

Related U.S. Application Data

(60) Provisional application No. 61/782,790, filed on Mar. 14, 2013.

(51) Int. Cl.
*H01M 8/06* (2016.01)
*H01M 8/04* (2016.01)

(52) U.S. Cl.
CPC ....... *H01M 8/04992* (2013.01); *H01M 8/0432* (2013.01); *H01M 8/04126* (2013.01); *H01M 8/04507* (2013.01); *H01M 8/04828* (2013.01); *Y02E 60/50* (2013.01)

(58) Field of Classification Search
CPC ............... H01M 8/04992; H01M 8/04828; H01M 8/0432; H01M 8/04507; H01M 8/04126; Y02E 60/50
USPC ......................................... 429/413
See application file for complete search history.

(56) References Cited

U.S. PATENT DOCUMENTS

| | | | |
|---|---|---|---|
| 7,749,661 B2 | 7/2010 | Zhang et al. | |
| 7,875,396 B2 | 1/2011 | Zhang et al. | |
| 8,048,585 B2 | 11/2011 | Skala | |
| 2011/0091781 A1* | 4/2011 | Folmsbee | H01M 8/00 429/413 |
| 2011/0113857 A1 | 5/2011 | Sinha | |
| 2011/0200895 A1* | 8/2011 | Sinha | H01M 8/04835 429/413 |
| 2011/0239747 A1 | 10/2011 | Zhang et al. | |

* cited by examiner

*Primary Examiner* — Gary Harris
(74) *Attorney, Agent, or Firm* — Quinn Law Group, PLLC

(57) ABSTRACT

A method and an apparatus to adapt the performance of a cathode humidification unit as a membrane in a fuel cell stack degrades over time. An algorithm compares a sensed humidity profile of the fuel cell stack and model humidity profile of a cathode humidification unit model to calculate a new degradation factor. The cathode humidification unit model uses the degradation factor in the performance of the cathode humidification unit.

20 Claims, 2 Drawing Sheets

CATHODE HUMIDIFICATION UNIT ADAPTING DEGRADATION FACTOR

CROSS REFERENCE TO RELATED APPLICATIONS

The present application hereby claims priority under 35 U.S.C. §119(e) to Provisional U.S. Application No. 61/782,790 filed Mar. 14, 2013, entitled "Cathode Humidification Unit Adapting Degradation Factor."

BACKGROUND

This invention relates to a method and apparatus to account for a degradation of a cathode humidification unit (CHU) over a period of time and more specifically to adapting CHU model parameters to ensure an efficient operation of the CHU over the period of time.

Fuel cells, particularly proton exchange membrane or polymer electrolyte membrane (in either event, PEM) fuel cells, require balanced water levels to ensure proper operation. For example, it is important to avoid having too much water in the fuel cell, which can result in the flooding or related blockage of the reactant flowfield channels. On the other hand, too little hydration limits the conductivity of the ion-transmissive membrane that is disposed between catalyzed electrodes; this high ionic resistance can lead to poor electrical performance, as well as premature cell failure. One popular way to promote proper levels of humidification or related water balance within the fuel cell is through one or more CHU (also referred to as the water vapor transfer (WVT) unit, membrane humidifier, fuel cell humidifier or the like). In a typical CHU configuration, wet-side and dry-side reactant flowpaths (for example, a cathode exhaust and a cathode inlet) are in moisture-exchange communication with one another through a membrane media in the CHU such that excess moisture leaving the cathode exhaust may diffuse through the media to the drier flowpath on the cathode inlet. Examples of WVT units may be found in U.S. Pat. Nos. 7,749,661, 7,875,396 and 8,048,585, all of which are assigned to the assignee of the present invention and the entire contents of which are herein incorporated fully by reference.

In situations where numerous fuel cells are arranged as part of a module, stack or related larger assembly of fuel cell system components, a good measure of an overall humidification level for the various cell membranes can be derived from a relative humidity sensor placed in the cathode inlet gas stream. This measurement is used in conjunction with other factors, for example, cathode inlet air flowrate, cathode inlet temperature and cathode inlet pressure, to estimate the water transfer rate (WTR) of the CHU as one indicia of its performance.

There are other ways of acquiring humidity information besides using the aforementioned sensors. One way takes advantage of a fuel cell's inherent high frequency resistance (HFR), which is a directly-measurable property related to the ability of protons to pass through the cell's ion-transmissive membrane; this mobility is in turn is a function of the level of humidification of the cell. One approach to using HFR as a way to estimate and control cathode inlet and outlet flow humidities may be found in U.S. Application 2011/0113857, filed on Nov. 19, 2009 and entitled Online Estimation of Cathode Inlet and Outlet RH from Stack Average HFR, which is owned by the Assignee of the present application and incorporated herein by reference.

While determining an HFR between stack terminals may provide a good measure of average stack membrane relative humidity for helping to meet stack efficiency targets, it is not sufficient for identifying issues related to CHU degradation or wear. The conventional way of characterizing CHU degradation is to perform off-line testing of the unit while on a component test stand. This necessitates removing the CHU from the fuel cell system, testing it on the component test stand and reinstalling the unit back in the system; such an approach requires a lot of CHU downtime (for example, about 48 hours). Consequently, performing frequent off-line testing of fuel cell systems—such as those contemplated for vehicular applications—as a way to determine unit degradation is not practical.

The CHU model takes the operating conditions, estimates the water transferred from the cathode outlet to the cathode inlet and then reports the stack cathode inlet molar water molar flowrate. The inlet water flowrate is used in the water buffer model to determine the outlet conditions of the stack cathode, which are then sent to the CHU wet side inlet. The inlet of the CHU is modified to account for water transfer to the anode side of the stack, which reduces the amount of water recycled to the CHU.

Over time, the CHU degrades causing the current humidification algorithms to overestimate the amount of water transferred back to the inlet of the fuel cell stack. This overestimate will affect the outlet humidification more at low current density than high because of the higher cathode stoichiometries run at low power. Higher stoichiometry means that the product water, an easily calculated number, is a smaller fraction of the total stack outlet water and that the inlet water, a quantity dependent on the CHU's performance, is a much larger fraction. As the CHU degrades, there is lower inlet water and therefore a drier membrane. A dry membrane produces a chemically induced degradation of the inlet portion of the fuel cell. This will increase the HFR measurement and result in lower cell voltage and lower system efficiency. Alternatively the operating conditions can be adjusted to increase cell humidification (lower temp, lower stoich, increased pressure for example), but all of these have negative impacts such as moving off the most efficient operating point, or limited heat rejection. Furthermore, as the CHU degrades, the fuel cell stack will be drier when operating temperatures are high, potentially leading to unacceptable system performance and material degradation.

Therefore a need exists to account for the degradation over the life of the CHU.

SUMMARY

In view of the above and other problems of the systems and technologies, it is an object of the disclosure to provide a method to account for the performance change of a CHU in a fuel cell system by checking if at least one enablement criteria is met, determining if a sensor is functioning and valid, sensing a humidity of a CHU with the sensor and determining a sensed humidity profile of the CHU using the sensed humidity from the sensor. The method continues by calculating a model humidity profile from a cathode humidification unit model and recording an error value in a computer readable medium as a difference of the model humidity profile and the sensed humidity profile. Finally, a degradation factor is adjusted if the at least one enablement criteria is met by using the error value. The method is repeated by the sensing of the humidity, determining the sensed humidity profile, calculating the model humidity profile, recording the error value, and adjusting the degradation factor while the at least one enablement criteria is still met.

In another embodiment, an apparatus for maintaining the performance of the CHU over its life is disclosed. A fuel cell system comprises at least one valve, a fuel cell stack, and the CHU fluidly coupled to each other. The apparatus includes a sensor coupled to the CHU and a controller electrically coupled to the sensor and the at least one valves and configured to adjust the at least one valves based on a CHU model and configured to execute a degradation algorithm. The degradation algorithm includes checking if at least one enablement criteria is met, determining if a sensor is functioning and valid, sensing a humidity of a CHU with the sensor and determining a sensed humidity profile of the CHU using the sensed humidity from the sensor. A model humidity profile is calculated from a cathode humidification unit model and an error value is recorded in a computer readable medium as a difference of the model humidity profile and the sensed humidity profile. Finally, a degradation factor is adjusted if the at least one enablement criteria is met by using the error value. The method is repeated by the sensing of the humidity, determining the sensed humidity profile, calculating the model humidity profile, recording the error value, and adjusting the degradation factor while the at least one enablement criteria is still met.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

A degradation algorithm adjusts a degradation factor in a CHU model to adjust for the CHU's performance over time. The degradation algorithm works by keeping track of cathode inlet water predicted by both the CHU model and either a relative humidity (RH) sensor (or dewpoint sensor) or from a HFR measurement for a period of time. When the prescribed amount of data is collected, the degradation algorithm triggers an adaption calculation to compute a new degradation factor by comparing a sensed humidity profile and a model humidity profile from the CHU model and making an adjustment based on the difference between the two values. A sensor selection function allows the use of either the RH sensor or HFR to be the source of the measured water accumulation or humidity of the fuel cell system for use in determining the sensed humidity profile.

Figure 1:
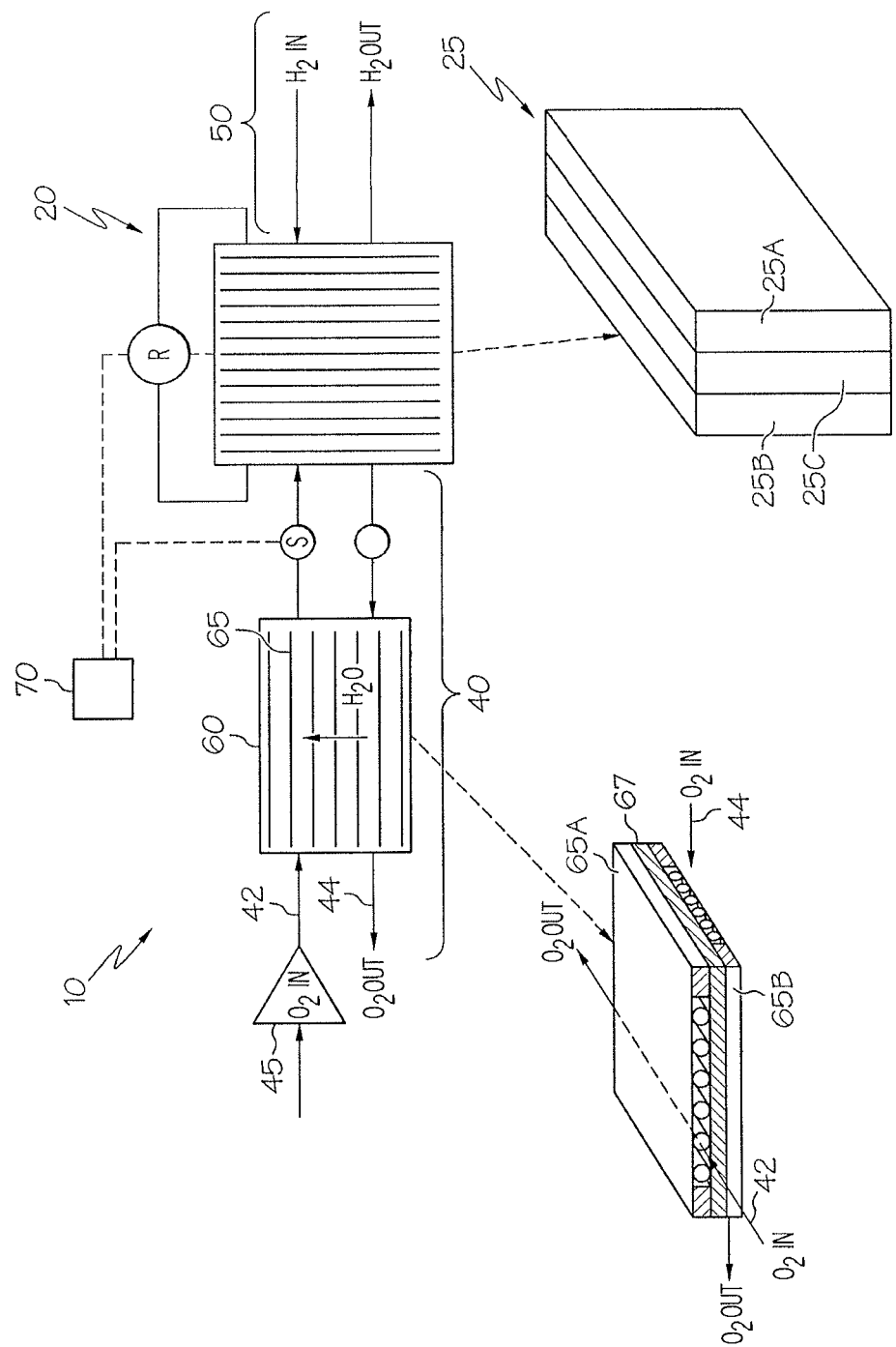
FIG. 1 depicts a block diagram of a fuel cell system with a CHU according to one or more embodiments shown and described herein.

Referring now to FIG. 1, a block diagram of a fuel cell system 10 with a CHU 60 is shown. A fuel cell system 10 includes a fuel cell stack 20 made up of numerous individual fuel cells 25, each of which has an anode 25A and cathode 25B separated by an ion-transmissive membrane 25C. As will be understood by those skilled in the art, numerous such cells 25 are combined to form the stack 20 such that the power generation is increased. Likewise, numerous such stacks 20 may be used. Various flowpaths 40, 50 are used to convey reactants and their byproducts to and from the stack 20 and are fluidly coupled to the stack 20. The CHU 60 is fluidly coupled to either or each of the respective flowpaths 40, 50 to promote the balanced humidity levels within one or both of them. One or more valves are fluidly coupled to the CHU 60 and stack 20. A controller 70, shown below, is configured to adjust the one or more valves to adjust the flow of reactants to the stack 20. As shown with particularity for the cathode-side reactant (i.e., an oxygen-bearing fluid), dry air from a compressor 45 is fed through an inlet flowpath 42 into the CHU 60. Likewise, stack cathode exhaust being discharged through an outlet flowpath 44 passes into and through the CHU 60. Inside the CHU 60 is a core made up of numerous plates 65 (two of which are shown in more detail as dry side plate 65A and wet side plate 65B) that are stacked in an alternating arrangement such that (with the exception of the outermost plates) each plate is sandwiched between plates of the opposing flowpath. A membrane medium 67 is formed between each pair of wet side and dry side plates to allow for selective exchange of humidity between the WVT inlet flowpath 42 and the stack cathode outlet flowpath 44.

A stack humidity sensor S provides in-situ WTR feedback of CHU 60. Similarly, a resistor R is symbolically represented and represents the HFR measurement of the stack 20. The HFR of the stack 20 is measured by perturbating a high frequency current across the stack 20 membrane, measuring the responding voltage, and solving for the HFR measurement. Controller 70 uses values obtained by sensor S and/or resistor R to measure respectively inlet relative humidity RHin of stack 20. In particular, at least one of such measurements, in conjunction with water specie balance, can be used to estimate a sensed humidity profile that includes outlet relative humidity RHout of stack 20. The resistor R may be particularly useful in situations where the sensor S fails to operate correctly, such as due to the presence of liquid water coming out of the CHU 60. Such backup measurement is particularly useful because failure circumstances are difficult to diagnose, and often occur during vehicle warm-up and vehicle idle to high power transients. Furthermore, an estimate of RHout based on water specie balance is very sensitive to temperature and stoichiometry; as such, errors in temperature, air flow or current measurement may limit the ability to provide proper stack humidification control absent a fallback measurement. More particularly, in such situations where the sensor S is not available, the stack HFR measurement of resistor R, which is based on HFR-λ-RH relationships such as described below and in the aforementioned U.S. Application 2011/0113857 can be used to estimate the in-situ WTR. A humidity profile (sensed or model) is a distinctive set of humidity characteristics that may include, for example, either the data sensed by the sensor or from the CHU model in addition to other factors to include time or duration, magnitude, set data from a look-up table corresponding to the operation parameters of the CHU.

Figure 2:
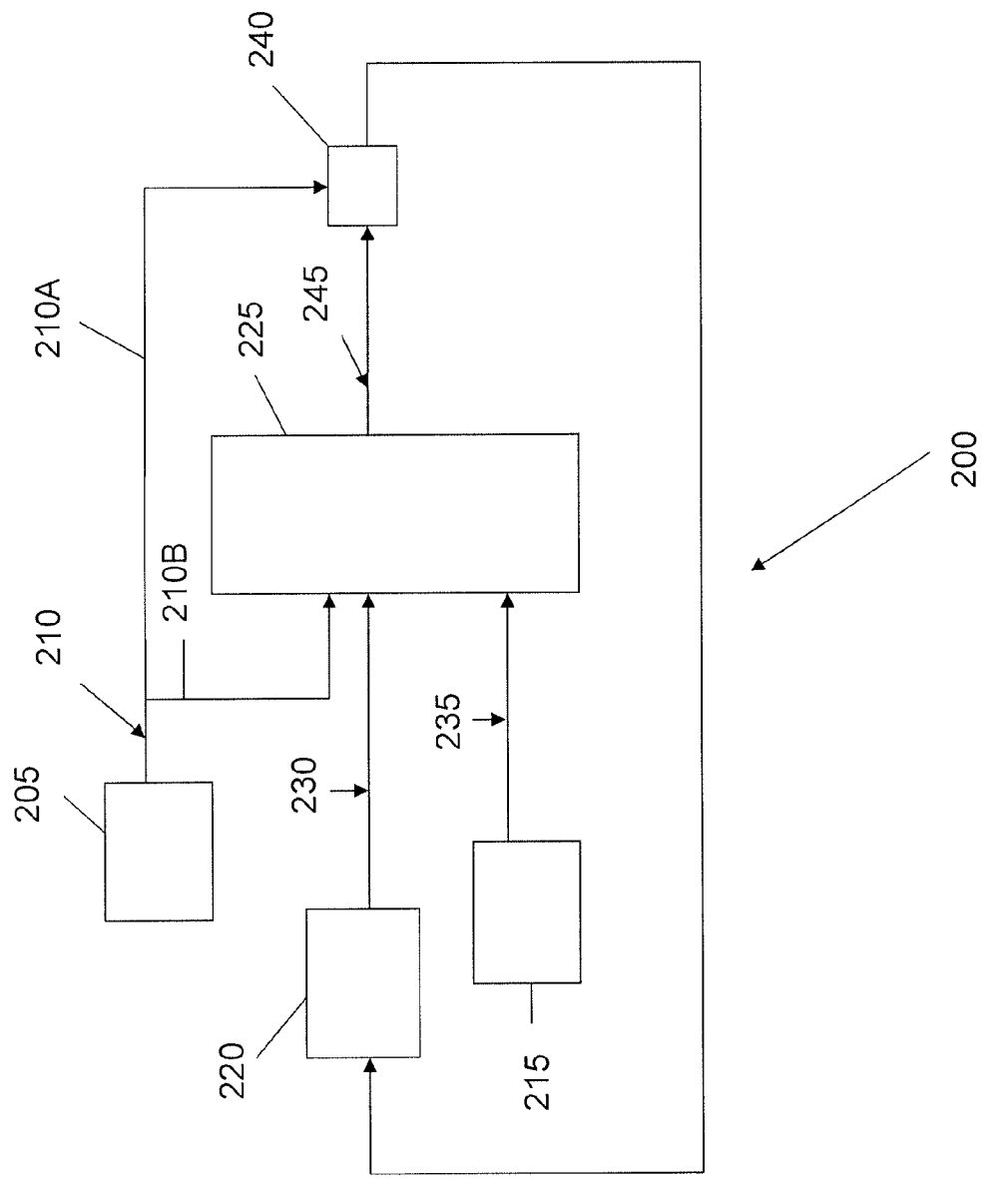
FIG. 2 depicts the degradation algorithm according to one or more embodiments shown and described herein.

FIG. 2 illustrates a degradation algorithm 200 used to adapt a degradation factor in the CHU model 220. The CHU model 220 is used to modify the percent opening of the one or more valves in the fuel cell system 10 to adjust the RH of the CHU and the fuel cell stack 20. The degradation algorithm may include the sensor selection function 215, an enable function 205, a data collection function 225, a CHU model 220, and a modify function 240. The controller 70 may be electrically coupled to one or more sensors throughout the fuel cell system 10. The one or more sensors may signally indicated sensed measurements or values to the controller for use by the degradation algorithm 200. In some embodiments, the CHU model 220 is part of the degradation algorithm 200 and may be accessible by another vehicle module. In another embodiment, the degradation algorithm 200 has access to the computer-readable medium of the CHU model 220 and has the ability to change CHU parameters of the CHU model 220 to include the degradation factor.

In one embodiment, the degradation algorithm 200 may be executed in the controller 70. The controller 70 may be electrically coupled to the one or more sensors directly. In another embodiment, the controller 70 may be electrically coupled to one or more vehicle modules and the one or more vehicle modules are electrically coupled to the one or more sensors. The controller 70 receives a sensed sensor signal indirectly from the one or more sensors through the one or more vehicle modules. In yet another embodiment, the degradation algorithm may be executed in the vehicle module such as, for example, the on-board control module (OCM) and the controller 70 may not be needed.

The sensor selection function 215 may take the one or more sensors into account to sense the humidity of the CHU 60 of FIG. 1. In one embodiment, the one or more sensors may include a humidity sensor. In another embodiment, the one or more sensors may include the HFR measurement from the stack 20. In the preferred embodiment, the one or more sensors may include both the humidity sensor and the HFR measurement. The humidity sensor is sensor S in FIG. 1 and the HFR measurement is resistor R in FIG. 1. The sensor selection function 215 may choose to use either the humidity sensor S or the HFR measurement R depending in the following considerations: whether either sensor is functioning; and/or whether either sensor is valid. A valid sensor may include factors outside of a functional sensor that may make the sensed measurement or value inaccurate such as if the fuel cell system 10 is operating outside of its temperature range which would affect the measurement or value from the sensor but not the function. Another example is if the humidity sensor S is not free of liquid water hence the measurement may be skewed but the sensor is still functioning. Another example is if the HFR measurement R or voltage is too high or too low. Included in the functioning and valid analysis is a diagnostic criteria further described below as part of the enable function 205.

Furthermore, the sensor selection function 215 may, through sensed input from other sensors from the one or more sensors or from another vehicle module, determine that either the humidity sensor S or the HFR measurement R is advantageous to use. For example when the fuel cell stack 20 is wet, the HFR measurement R may not be valid. For example, as the stack 20 reaches 100% RH, or fully saturated, the HFR measurement reaches a minimum value and no longer provides useful information on the condition of the stack 20. Further, the HFR measurement tends to get insensitive as the stack 20 RH increases. The HFR measurement is the most accurate to actual RH conditions in the stack 20 when RH is low. One or more vehicle modules may know and indicate when the fuel cell stack 20 is not dry and signally communicate that information to the controller 70 for use by the degradation algorithm 200 when choosing which sensor to use. In an alternative embodiment, the controller 70 may retrieve the status of the fuel cell stack 20 from the vehicle module.

The humidity sensor S can be used with one or more sensors in the fuel cell system 10 to estimate the fuel cell stack 20 cathode inlet water molar flowrate through psychrometrics and define the sensed humidity profile of the CHU. The HFR sensor describes the weighted average of humidification within the fuel cell stack 20. A HFR to RH algorithm uses the one or more sensors in the fuel cell stack 20 to define the sensed humidity profile of the CHU.

The enable function 205 monitors or tracks one or more enablement criteria. The enable function 205 provides an adapt trigger 210 to allow adaption or modification of the degradation factor. If the adapt trigger 210 is not indicated, the degradation factor will not adapted. The adapt trigger 210 may be either provided to the data collection function 225 or to a modify function 240. The modify function 240 may allow the CHU model 220 degradation factor to be modified or may not allow the degradation factor to be modified. In one embodiment, the modify function 240 may not modify the degradation factor until the adapt trigger signal 210A is given by the enable function 205. In another embodiment, the modify function 240 may not modify the degradation factor until it receives an average error value 245 from the data collection function 225. In this embodiment, the data collection function 225 may only provide the average error value to the modify function 240 while the adapt trigger 210B is present.

Examples of the one or more enablement criteria may include tracking a temperature of the fuel cell system 10 and not signally indicate the adapt trigger 210 if fuel cell system 10 is not operating within a specified thermal range. The controller 70 may be electrically coupled to a temperature sensor which may be thermally coupled or electrically coupled to the fuel cell system 10. The temperature sensor is sensed by the controller 70 and the enable function 205 determines if the sensed temperature is within the specified thermal range. The specified thermal range may be the temperature range at which the fuel cell system 10 normally operates in. It may not include when the fuel cell system 10 is warming up, from a cold start for example. This may ensure that the fuel cell system 10 is operating an optimum steady state in which the CHU model 220 may be accurately predicted. To disable adaptation, the enable function 205 will not provide the adapt trigger 210 signal. The enable function may provide the adapt trigger 210 and not disable adaption of the degradation factor when the fuel cell system is within a specified thermal range.

Another example of the enablement criteria may include when the enable function 205 may also disable the adaption of the degradation factor when the fuel cell system is not in a specified mode. For example, the fuel cell system 10 may not be in a mode where the fuel cell system 10 is in a predictable state where sensed sensor values are predicted to be within a specific range of values. Examples of the specified mode include a run mode, a warm-up mode or a diagnostic mode. The enable function 205 may also disable adaption of the degradation factor when the fuel cell system indicates a diagnostic is active. Examples of diagnostics are: air mass flowmeter faults, cathode pressure sensors faults, coolant temperature sensor faults, fuel cell stack 20 current sensor fault, low average minimum cell voltage, anode leak detection and/or rationality, and cathode leak detection and/or rationality. The diagnostic is usually active or indicated when there is an error with the corresponding vehicle system. When there is a diagnostic which may affect the performance of the fuel cell system 10 the degradation factor should not be modified because of the potential error in the error value and hence error to the modification of the degradation factor.

The enable function 205 may also disable adaption of the degradation factor during a fuel cell system bleed event and/or after the fuel cell system bleed event. The bleed event purges the contents of the anode to the cathode of the stack 20 and in some cases in the inlet of the cathode. Since the bleed event may add water to the cathode from the anode as well as react hydrogen that is bled into it, the adaption is discontinued. The added water and reacting hydrogen may affect the accuracy of the one or more sensors. Therefore, the enable function 205 may wait until the anode bleed is complete and the system has resumed its normal water characteristics before restarting the adaption.

In the data collection function 225, a sensed humidity profile 235 from the sensor selection function 215 and a model humidity profile 230 from the CHU model 220 are stored in a computer-readable medium during an adaption period. The adaptation period provides a start-point and an end-point during which the model humidity profile 230 and the sensed humidity profile 235 are compared and the difference between the two is an error value and is stored in the computer-readable medium. During the adaption period, the successive error values are accumulated in the computer-readable medium and define a plurality of error values. In one embodiment, at the end of the adaption period, the error values are averaged and the average error value 245 is provided to the modify function 240. If the adapt trigger is provided 210, the degradation factor is adapted.

In another embodiment, while the adapt trigger 210 is provided, the average error value 245 is constantly being calculated and the degradation factor is constantly being adapted. The adaptation period may be an amount of time the enable function 205 enables the adaption of the degradation factor. In other words, when the length of time the enable function 205 provides the adapt trigger 210 defines the adaption period.

The degradation algorithm 200 may limit the amount of change to the degradation factor during each adaptation period. Adapting the CHU model 220 too quickly may cause inaccuracies in the CHU model 220. The data accumulation timer is stored in the computer-readable medium and may be a short amount time or a long amount of time and may depend on a variety of factors. The data accumulation timer is a function of CHU run time (i.e. age or length of time in operation) and allows for a variability of a speed at which the degradation factor of the CHU model 220 is adapted. The CHU tends to degrade slowly over time rather than in very large chunks quickly. To account for this, the data accumulation timer may run, or collect successive error values over a period of hours rather than minutes or seconds. In another embodiment, the data accumulation timer may run over a period of days instead of hours and span one or more on-off cycles of the vehicle. In yet another embodiment, the data accumulation timer may run more than once within a single adaption period. When a time limit is reached by the data accumulation timer, the computer-readable medium will not accept any more error values. The average error value may then be determined and sent to the modify function 240. The data accumulation timer may prevent any further error values during the remaining period of time of the adaption period.

For example, if the CHU is new, the degradation factor may need to be adapted quickly to account for variability in manufacturing tolerances and slow down as the CHU ages. In this example, the data accumulation timer defines a short period. This allows the modify function 240 to adapt the degradation factor quicker with fewer amounts of successive error values being accumulated. The faster the CHU model 220 is adapted when the CHU is new, the faster the CHU model 220 will run the CHU efficiently.

When the CHU is new, in one embodiment, the degradation factor is the same as when the old CHU was operational and the degradation algorithm 200 adapts the degradation factor to correspond with the new CHU. In another embodiment, when a new CHU is indicated, the degradation factor is reset to an initial set value. The initial set value may be 1.

In some embodiments, indication of a new or replaced CHU may be done through a specific bit in the computer-readable medium that is changed by a service technician when the CHU is installed. In another embodiment, a change in the serial number of the CHU stored in the computer-readable medium may indicate a new or replaced CHU when changed. The change may occur automatically through a signaling means with a CHU controller or through manual means by a service technician.

The stack cathode inlet water molar flowrate, described above, estimated from either the humidity sensor S or HFR measurement R may be directly compared to the molar flowrate as estimated by the CHU model 220. As described above, if an error exists (error value), the degradation factor for the mass transfer coefficients would be adjusted until no error remained in the degradation factor of the CHU model 220. A problem with this scheme is that high current density would likely have higher magnitude flowrate errors, which would cause a bias toward high current density in the adaptation by the degradation algorithm 200. To remove that bias, the error value would be normalized by the water expected by the CHU model 220. The HFR measurement R is usually better at estimating the CHU outlet RH. The data collection function 225 accumulates the normalized error data between the sensed humidity profile 235 and the model humidity profile 230. When enough data has been captured, the degradation algorithm 200 may determine how much the normalized error data differs from the CHU model 220 degradation factor and will adjust the degradation factor to close that gap.

The CHU model 220 may be required to degrade the high power water transfer rate by a specified amount over the course of its life of the CHU. In some embodiments, the specified amount may be about 10% to about 30%. In another embodiment, the specified amount may be about 20%. If the average error value 245 indicates a larger rate, it may be indicative of an otherwise undetected sensor failure. To protect the degradation algorithm 200 against adapting further than realistic CHU degradation would predict, an upper threshold and a lower threshold are used to limit the amount the modify function 240 may change the degradation factor. The degradation algorithm 200 may be allowed to adapt more on the lower CHU water transfer side, indicating decreased CHU performance, than on the higher side. No mechanisms are known to improve CHU performance over time though some CHUs may start out better than nominal. Thus, adapting wetter is permitted. If the degradation factor reaches either the upper threshold or lower threshold, the degradation algorithm 200 may indicate that the CHU needs to be replaced and/or serviced. The diagnostic may be set that indicates this CHU needs to be replaced and/or serviced. Setting the diagnostic may disable the adapt trigger 210 as described above. The fuel cell system 10 may continue to operate and if the average error value modifies the degradation factor below the upper threshold or above the lower threshold and back within operation limits, the indication and/or setting the diagnostic may be removed.

Another approach to deal with the degradation factor reaching the upper threshold may be to reset degradation factor back to the initial set value. For example, the initial set value may be 1. That would address the high likelihood that it was a sensor failure rather than actual CHU improvement that caused the system to adapt to that point. For example, wet may be the upper threshold which equates to a high degradation factor and may indicate the CHU 60 is over performing and dry may be the lower threshold which equates to a low degradation factor and may indicate the CHU 60 is underperforming. In some embodiments, the lower threshold may need to be exceeded for a period of time before indication of replacement is given. In another embodiment, once the lower threshold is exceeded, indication of replacement is given.

In yet another embodiment, any error values that are above the upper threshold or below the lower threshold may be discarded from the computer-readable medium and not used in calculating the degradation factor.

In some embodiments, the degradation factor may be allowed to be adapted without limitation. In another embodiment, the degradation algorithm 200 may limit the adaptation of the degradation factor with a predefined upper limit and a predefined lower limit. The predefined upper limit and the predefined lower limit may be between an expected range of CHU performance.

Indication as used throughout this disclosure may include a memory bit or bits, (software flag) in the computer-readable medium, used by the controller 70 to determine if a value is present or not. Indication may also mean a signal received by the controller 70 from the one or more sensors with a value or measurement sensed by the one or more sensors. Indication may also mean a visual signal or an audible signal to a user. Indication may provide notice of an occurrence or event.

The present disclosure may be embodied in hardware and/or in software (including firmware, resident software, micro-code, etc.). The system controller may have at least one processor and the computer-readable medium. A computer-usable or the computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present disclosure may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus for maintaining performance of a cathode humidification unit (CHU) within a fuel cell system, the fuel cell system comprising the CHU fluidly coupled to at least one valve and a fuel cell stack, the apparatus comprising:
   a sensor coupled to the CHU; and
   a controller electrically coupled to the sensor and the at least one valve, the controller comprising a processor and a computer readable medium containing computer readable and executable instructions which, when executed by the processor, cause the controller to automatically:
   check if at least one enablement criteria is met,
   determine if the sensor is functioning and valid based on a status of the fuel cell system,
   sense a humidity of the CHU with the sensor,
   determine a sensed humidity profile of the CHU using the sensed humidity from the sensor,
   calculate a model humidity profile,
   calculate an error value as a difference of the model humidity profile and the sensed humidity profile,
   adjust a degradation factor using the error value if the at least one enablement criteria is met, and
   adjust the at least one valve based on the degradation factor.

2. The apparatus of claim 1, wherein the computer readable and executable instructions are executed by the processor to cause the controller to automatically calculate an average error value from an average of a plurality of error values stored in the computer readable medium and adjust the degradation factor using the average error value.

3. The apparatus of claim 2, wherein the computer readable and executable instructions are executed by the processor to cause the controller to automatically calculate the error value only during an adaptation period.

4. The apparatus of claim 3, wherein the adaptation period is a period of time the at least one enablement criteria is met.

5. The apparatus of claim 3, wherein the error value is calculated only when a data accumulation timer is running.

6. The apparatus of claim 1, wherein the computer readable and executable instructions are executed by the processor to cause the controller to automatically initialize the degradation factor to an initial set value in the computer-readable medium if the cathode humidification unit is new.

7. The apparatus of claim 1, wherein the computer readable and executable instructions are executed by the processor to cause the controller to automatically indicate a need for service of the CHU when the error value is above an upper threshold or when the error value is below a lower threshold.

8. The apparatus of claim 1, wherein the sensor is a relative humidity sensor or a high frequency resistance measurement.

9. A system for maintaining performance of a cathode humidification unit (CHU), the system comprising:
   a fuel cell stack fluidly coupled to the CHU;
   at least one valve configured to, when actuated, adjust a relative humidity of the CHU and the fuel cell stack;
   a sensor coupled to the fuel cell stack, the CHU, or both, the sensor configured to sense humidity within the CHU; and
   a controller electrically coupled to the sensor and the at least one valve, the controller comprising a processor and a computer-readable medium, the computer-readable medium containing computer readable and computer executable instructions that, when executed by the processor, cause the controller to automatically:
      determine whether an enablement criteria is met,
      determine whether the sensor is functioning and valid based on a status of the fuel cell stack,
      sense, using the sensor, an amount of humidity within the fuel cell stack, the CHU, or both,
      determine, using the amount of humidity, a sensed humidity profile of the CHU,
      calculate, using a CHU model, a model humidity profile,
      calculate, using a difference between the model humidity profile and the sensed humidity profile, an error value,
      store, using the computer-readable medium, the error value to produce at least one stored error value,
      adjust, using the at least one stored error value and if the enablement criteria is met, a degradation factor, and
      actuate, based on the degradation factor, the at least one valve to adjust a relative humidity of the CHU and the fuel cell stack.

10. The system of claim 9, wherein determination of the sensed humidity profile of the CHU, calculation of the model humidity profile, calculation of the difference between the model humidity profile and the sensed humidity profile, and storage of the error value occur a plurality of times prior to adjustment of the degradation factor, and wherein using the at least one stored error value includes averaging the at least one stored error value.

11. The system of claim 9, wherein calculation of the error value and storage of the error value occur only during an adaptation period.

12. The system of claim 11, wherein the adaptation period is a period of time when the enablement criteria is met.

13. The system of claim 11, wherein calculation of the error value occurs only during a period when a data accumulation timer is running.

14. The system of claim 9, wherein the computer readable and computer executable instructions, when executed by the processor, further cause the controller to automatically:
   initialize, in response to the CHU being generally new, the degradation factor to an set value, the initialization occurring prior to the adjustment of the degradation factor.

15. The system of claim 9, wherein the computer readable and computer executable instructions, when executed by the processor, further cause the controller to automatically:
   indicate, in response to the error value being outside of a lower threshold and an upper threshold, a need for service of the CHU.

16. The system of claim 9, wherein the sensor is one of a relative humidity sensor and a high-frequency resistance measurement sensor.

17. The system of claim 9, wherein the computer readable and computer executable instructions, when executed by the processor, further cause the controller to automatically:
   reset, in response to the error value being outside of a lower threshold and an upper threshold, the degradation factor.

18. The system of claim 9, wherein the enablement criteria include a temperature of the fuel cell system, a specified mode, a diagnostic being active, a bleed event, or combinations thereof.

19. The system of claim 9, wherein the computer readable and computer executable instructions, when executed by the processor, further cause the controller to automatically:
   discard, in response to the error value being above an upper threshold, the error value such that adjustment of the degradation factor does not include using error values above the upper threshold.

20. The system of claim 9, wherein the computer readable and computer executable instructions, when executed by the processor, further cause the controller to automatically:
   discard, in response to the error value being below a lower threshold, the error value such that adjustment of the degradation factor does not include using error values below the lower threshold.

* * * * *